United States Patent [19]

Nishihara et al.

[11] Patent Number: 4,749,753

[45] Date of Patent: Jun. 7, 1988

[54] INTIMATE MIXTURE CONTAINING AROMATIC POLYAZOLE AND AROMATIC COPOLYAMIDE AND PROCESS FOR ITS PRODUCTION

[75] Inventors: Toshio Nishihara; Hiroshi Mera; Zenichiro Endo, all of Iwakuni, Japan

[73] Assignee: Agency of Industrial Science and Technology, Tokyo, Japan

[21] Appl. No.: 880,828

[22] Filed: Jul. 1, 1986

[30] Foreign Application Priority Data

Jul. 3, 1985 [JP] Japan .................................. 60-144576
Jul. 3, 1985 [JP] Japan .................................. 60-144577
Jul. 3, 1985 [JP] Japan .................................. 60-144578
Jul. 25, 1985 [JP] Japan .................................. 60-163057

[51] Int. Cl.$^4$ ............................................ C08L 77/00
[52] U.S. Cl. ................................... 525/411; 525/417; 525/420
[58] Field of Search ....................... 525/411, 417, 420

[56] References Cited

U.S. PATENT DOCUMENTS 4,207,407 6/1980 Helminiak et al. ................. 525/425
4,228,218 10/1980 Takayanagi et al. ................. 525/92
4,631,318 12/1986 Hwang et al. ....................... 525/417

Primary Examiner—Lewis T. Jacobs
Assistant Examiner—A. Carrillo
Attorney, Agent, or Firm—Sherman and Shalloway

[57] ABSTRACT

An intimate mixture comprising (A) a substantially linear aromatic polyazole and (B) a sparingly crystallizable aromatic copolyamide having a glass transition temperature of at least 200° C. and a flow initiation temperature of not more than 500° C. in such proportions represented by A/(A+B)=0.15−0.70 by weight, and a process for producing the intimate mixture, which comprises dissolving the aromatic polyazole (A) and the aromatic copolyamide (B) in a weight ratio represented by A/(A+B)=0.15−0.70 in a common solvent, and forming an intimate mixture of the aromatic polyazole (A) and the aromatic copolyamide (B) from the solution using a coagulating agent.

12 Claims, No Drawings

INTIMATE MIXTURE CONTAINING AROMATIC POLYAZOLE AND AROMATIC COPOLYAMIDE AND PROCESS FOR ITS PRODUCTION

FIELD OF THE INVENTION

This invention relates to an intimate mixture containing an aromatic polyazole and an aromatic copolyamide and a process for its production. The invention also pertains to a laminated structure having excellent heat resistance, excellent mechanical properties and high modulus, and a process for its production.

DESCRIPTION OF THE PRIOR ART

Fiber-reinforced plastics are important as load-bearing structural composite materials because of their strikingly improved properties, and have been developed in a wide variety and gained commercial acceptance.

Production of such a composite material requires a complex stepwise procedure including, for example, a step of laying separately prepared reinforcing fibers in one direction and a step of impregnating a matrix polymer to be reinforced in the reinforcing fibers, or a step of carrying out such an operation in an autoclave. The strength and durability of the composite material is largely dependent upon the state of an interface between the reinforcing fibers and the matrix polymer. Since the fibers themselves are a macroscopic material, the interface between the two is a macroscopic interface. Any defect which exists therein propagates macroscopically and leads to fracture of the composite material.

In order to solve such a problem, attempts have been made to produce a polymeric composite in which a reinforcing component and a component to be reinforced are dispersed and mixed in a very microscopic condition by using a high modulus reinforcing polymer capable of being dispersed molecularly and microscopically instead of the fibrous reinforcing material which can be dispersed only macroscopically, dissolving the reinforcing polymer and a matrix polymer in a common solvent to mix them molecularly and microscopically, and coagulating and fabricating the solution.

Articles of the polymeric composite in practical applications have to be produced by laminating tapes or films of the polymeric composite as primary molded articles or molding particles of the polymeric composite under heat and pressure. Frequently, however, such articles do not prove to be satisfactory. For example, even when the matrix polymer alone has good melt-adhesive property, the resulting polymeric composite has reduced melt-adhesive property. Furthermore, during the fabrication of the primary molded article under heat and pressure, the reinforcing component and the reinforced component dispersed microscopically in the primary molded artcles undergo phase separation, and become macroscopically dispersed in the final molded article.

It has been strongly desired therefore to find out a combination of a reinforcing polymer and a polymer to be reinforced (a matrix polymer) which are microscopically dispersed even in the final molded article.

Japanese Laid-Open Patent Publication No. 65747/1979 discloses a composite consisting substantially of at least two polymeric substances, said composite comprising a first rigid polymeric substance in which the major portion of the constituent polymer chains are composed of rigid polymer chains the substantial length of the polymer chains in the rigid portion being at least 50 Å on an average, and a second polymeric substance composed substantially of flexural polymer chains, the content of the rigid polymeric substance as the first polymeric substance being not more than 20% based on the amount of the polymers in the composite, and the first rigid polymeric substance being uniformly dispersed in the second polymeric substance in a microscpic region of not more than 1 micrometer. The polymeric composite containing the rigid polymer has good melt-adhesive property, but its heat resistance and mechanical strength are not sufficient.

Am. Chem. Soc., Div. Org. Coating Plast. Prepr., 48, 929 (1983) discloses molecular composites of rigid rod poly-p-phenylenebenzobisthiazole (PPBT) in thermoplastic matrices, and describes poly-2,5(6)benzimidazole (ABPDI), poly-p-phenylenequinoxaline (PPQ-412) and nylon as the matrices. When the first two polymers are used as the matrices, the resulting molecular composite has good heat resistance and mechanical strength, but poor melt-adhesive property. On the other hand, when nylon is used as the matrix, the resulting molecular composite has good mechanical strength and melt-adhesive property but low heat resistance.

International Publication Number WO79/01029 discloses polymeric alloys of rod-like and coil-like aromatic heterocyclic polymers useful for the fabrication of high strength load bearing structural components. These polymeric alloys have good heat resistance and mechanical strength but poor melt-adhesive property.

None of the polymeric substance combinations of the prior art discussed above simultaneously have satisfactory heat resistance, mechanical strength and melt-adhesive property.

Organic reinforcing fibers heretofore used for composite materials are more liable to undergo fibrillation when their modulus becomes higher. However, it may be possible to produce a polymeric composite having high modulus and resistance to fibrillation by using such organic fibers, and research work has already been under way toward that goal.

To improve the dynamic properties of such polymeric composites, the reinforcing polymer and if required the matrix polymer as well should be highly oriented in primary fabricated articles of the composites (such as tapes, films or fibers). When the orientation of the two polymers is effected fully, the modulus of the resulting composite reaches a value represented by the sum of the expected moduli of the individual components. In fact, it is lower than this value because the orientation is not sufficient.

It has been known that pulp-like materials having excellent heat resistance, mechanical properties and electrical properties can be obtained from aramides such as poly(m-phenylene isophthalamide) and poly(p-phenylene terephthalamide) and are useful as materials for laminates, synthetic paper-like sheets and abrasion materials or a resin reinforcing material. However, pulp-like materials composed only of an insoluble polymer such as aramide cannot be laminated by melt-adhesion. On the other hand, a laminated material and a resin reinforcing material having excellent heat resistance and dynamic properties are difficult to obtain from pulp-like materials composed only of a melt-adhesive polymer. It might be possible to obain a pulp-like material having the properties of both a highly rigid polymer and a melt-adhesive polymer by mixing them in the molten or solution state. However, no specific method has yet been developed which gives a pulp-like material having both melt-adhesion laminatability and molecular orientability which can lead to high heat resistance and high dynamic properties.

SUMMARY OF THE INVENTION

It is a first object of this invention to provide an intimate mixture of polymeric substances simultaneously having satisfactory heat resistance, mechanical strength and melt-adhesive property.

A second object of this invention is to provide a process for producing an intimate mixture of polymeric substances simultaneously having satisfactory heat resistance, mechanical strength and melt-adhesive property.

A third object of this invention is to provide a laminated structure obtained from an intimate mixture of polymeric substances simultaneously having satisfactory heat resistance, mechanical strength and melt-adhesive property.

A fourth object of this invention is to provide a process for producing a laminated structure from an intimate mixture of polymeric substances simultaneously having satisfactory heat resistance, mechanical strength and melt-adhesive property.

The first object is achieved in accordance with this invention by an intimate mixture comprising (A) a substantially linear aromatic polyazole and (B) a sparingly crystallizable aromatic copolyamide having a glass transition temperature of at least 200° C. and a flow initiation temperature of not more than 500° C. in such proportions represented by A/(A+B)=0.15−0.70 by weight.

The second object is achieved in accordance with this invention by a process for producing an intimate mixture comprising (A) a substantially linear aromatic polyazole and (B) a sparingly crystallizable aromatic copolyamide having a glass transition temperature of at least 200° C. and a flow initiation temperature of not more than 500° C. in such proportions represented by A/(A+B)=0.15−0.70 by weight, which comprises dissolving the aromatic polyazole (A) and the aromatic copolyamide (B) in said weight proportions in a common solvent, and forming an intimate mixture of the aromatic polyazole (A) and the aromatic copolyamide (B) from the solution using a coagulating agent.

The third object is achieved in accordance with this invention by a laminate structure obtained from an intimate mixture comprising (A) a substantially linear aromatic polyazole and (B) a sparingly crystallizable aromatic copolyamide having a glass transition temperature of at least 200° C. and a flow initiation temperature of not more than 500° C. in such proportions represented by A/(A+B)=0.15−0.70 by weight.

The fourth object is achieved in accordance with this invention by a process for producing a laminated structure, which comprises laminating layers of an intimate mixture comprising (A) a substantially linear aromatic polyazole and (B) a sparingly crystallizable aromatic copolyamide having a glass transition temperature of at least 200° C. and a flow initiation temperature of not more than 500° C. in such proportions represented by A/(A+B)=0.15−0.70 by weight, and compression-molding the laminate at a temperature satisfying the following formula (3)

$$Tg \leq Ta \leq Td \quad (3)$$

wherein Ta is the compression molding temperature (°C.), Tg is the glass transition temperature (°C.) of the aromatic copolyamide (B), and Td is the temperature (°C.) at which the aroamtic copolyamide shows a 15% weight loss in an inert atmosphere, under a pressure of 100 to 5,000 kg/cm².

DETAILED DESCRIPTION OF THE PREFERRED EMBODIMENTS

The present inventors have made extensive investigations in order to discover a matrix polymer capable of developing excellent heat resistance and dynamic properties when used in combination with a polyazole-type polymer such as poly-p-phenylenebenzoxazole which now gives the highest tensile modulus among organic polymeric fibers as a reinforcing polymer. These investigations have led to the present invention.

The present invention provides an intimate mixture comprising (A) a substantially linear aromatic polyazole and (B) a difficultly crystallizable aromatic copolyamide having a glass transition temperature of at least 200° C. and a flow initiation temperature of not more than 500° C. in such proportions represented by A/(A+B)=0.15−0.70 by weight.

The above intimate mixture comprising the aromatic polyazole (A) and the aromatic copolyamide (B) has not been known heretofore.

The substantially linear aromatic polyazole (A) used in this invention is, for example, a polyazole having a substantially rod-like azole skeleton represented by the following formula

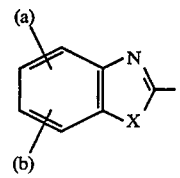

wherein X represents —S—, —O— or

the bonds (a) and (b) further form an azole ring or an aromatic hydrocarbon ring, or a hydrogen atom is bonded to one of these bonds and the other is a bond. Specific examples are the polymers described in U.S. Pat. No. 4,297,407, above all poly-p-phenylenebenzobisthiazole, poly-p-phenylenebenzobisoxazole and poly-p-phenylenebenzobisimidazole.

These polymers preferably have a high molecular weight, and usually have an inherent viscosity of at least 1, preferably at least 2, especially preferably at least 2.5.

The sparingly crystallizable aromatic copolyamide (B) used in this invention has recurring units selected from the following recurring units (A) to (I) so that the proportion of —CO— becomes substantially equal to that of —NH—. The benzene ring in the above recurring units (A) to (I) may contain a methyl group, an ethyl group, a nitro group, a sulfone group, an amino group, an acetyl group, an acetylamino group, a hydroxyl group, etc.

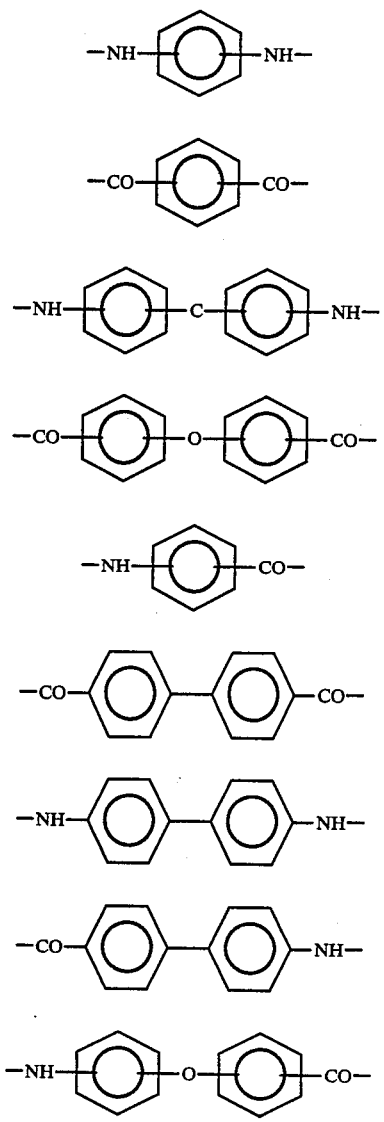

Poly-p-(and/or m-)phenylene iso(and/or tere)phthalamide containing 30 to 70% of the p-phenylene skeleton is one example of an aromatic copolyamide suitable both economically and functionally. Another example is a copolymer of 10 to 40 mole % of p-phenylenediamine, 40 to 15 mole % of 3,4'-diaminodiphenylether and 50 mole % of terephthaloyl dichloride.

The inherent viscosities of these aromatic copolyamides, which are measures of their molecular weights, are at least 0.8, preferably at least 1, especially preferably at least 1.2.

The aromatic copolyamide (B) has a glass transition temperature of at least 200° C., preferably at least 220° C., and a flow initiation temperature of not more than 500° C., preferably not more than 470° C.

The glass transition temperature is measured by a thermomechanical analyzer (DMA made by E. I. Du Pont de Nemours & Co.).

The flow initiation temprature is measured by using a Koka-type flow tester. The aromatic copolyamide (B) is filled in the cell of the flow tester and the temperature at which the polymer (B) begins to flow from a nozzle having a diameter of 1 mm and a flow passage length of 5 mm under a pressure of 100 kg/cm$^2$ is measured, and defined as the flow initiation temperature.

The aromatic copolyamide (B) is sparingly crystalline and should be semi-crystalline or nearly amorphous. If the crystallinity of the aromatic copolyamide (B) is high, its dispersibility in the aromatic polyazole (A) becomes poor, and a molded article having excellent properties cannot be produced from the resulting intimate mixture.

Preferably, the aromatic copolyamide (B) is an aromatic copolyamide which produces apparent crystals (crystallites) having a size of not more than 25 Å when maintained for 5 hours at a temperature intermediate between its glass transition temperature and its flow initiation temperature. If the size of the crystallites is not more than 25 Å, a primary molded article of the resulting intimate mixture has good heat melt-adhesive property. If it exceeds 25 Å, the molded article has poor heat melt-adhesive property, and the final molded article tends to undergo delamination at the bonding interface.

It is critical that the proportion of the reinforcing polymer (A) based on the sum of the polymer (A) and the matrix polymer (B) should be within 0.15 to 0.70, preferably 0.2 to 0.6, by weight as A/(A+B). If it is below 0.15, association of the reinforcing polymer with itself decreases and the reinforcing effect decreases. If it exceeds 0.70, the melt-adhesive property of the intimate mixture is reduced, and a final molded article of good quality is difficult to obtain.

The intimate mixture of this invention denotes a mixture in which the aromatic polyazole (A) and the aromatic copolyamide (B) are microscopically dispersed and mixed.

When the cross-section of a conventional fiber-reinforced plastic is viewed under an optical microscope, a fibrous portion can generally be distinguished from a plastic portion. In contrast, in the intimate mixture of this invention, it is extremely difficult, or impossible, to distinguish the aromatic polyazole (A) from the aromatic copolyamide (B) in its cross section under an optical microscope.

Preferably, in the intimate mixture, the aromatic polyazole (A) and the aromatic copolyamide (B) exist in a microscopically shapeless form.

Macroscopically, the intimate mixture of this invention can be obtained as a material in the form of a film, tape, fiber, powder, particle or pulp.

The intimate mixture of this invention may mainly comprise a highly rigid reinforcing polymer component and a matrix polymer component having melt-adhesive property.

Preferably, the rigid polymer used as the reinforcing polymer component has the highest possible modulus. Such a polymer preferably shows a modulus of at least 100 GPa, preferably at least 200 GPa, in the form of fibers.

The weight proportions of the polymers used as the reinforcing component (A) and the matrix components (B) can be selected according to the purpose and application for and in which the intimate mixture of this invention is used. Since the intimate mixture of this invention can be used for a wide range of purposes and in a wide range of applications, it is difficult to generalize the preferred weight proportions of the polymers. Usually, the proportion of the reinforcing polymer based on the entire polymers is 0.15 to 0.70 (by weight), preferably 0.20 to 0.60 (by weight).

The present invention also provides a process for producing the intimate mixture described above, which comprises dissolving the aromatic polyazole (A) and the aromatic copolyamide (B) in the aforesaid weight proportions in a common solvent, and forming an intimate mixture of the aromatic polyazole (A) and the aromatic copolyamide (B) from the solution using a coagulating agent.

The common solvent should be one which dissolves both polymer components. Examples are acidic solvents such as concentrated sulfuric acid, methanesulfonic acid, chlorosulfonic acid, polyphosphoric acid, and trifluoroacetic acid. They may be used in suitable combinations. To inhibit the hydrolysis of the dissolved polymers, it is possible to incorporate an additive which minimizes the amount of water in the solvent. Examples of the additive are fuming sulfuric acid and chlorosulfonic acid.

As a primary molded article, the polymeric composite in accordance with this invention is obtained as a film or tape, a filament, granules or a pulp-like material. It is obtained by dissolving the aromatic polyazole (A) and the aromatic copolyamide (B) in a common solvent, and discharging the resulting solution, preferably optically isotropic, into a coagulating solution by the wet or the semi-dry semi-wet method to mold it into a predetermined shape.

It has also been found in accordance with this invention that a film or filament of the polymeric composite having a high modulus can be obtained by a method which comprises extruding a polymer solution containing mainly (A) a polyazole substantially having a rod-like skeleton and (B) an aromatic copolyamide having melt adhesive property into a gaseous atmosphere from a die or an orifice, introducing it into a coagulating bath and continuously taking it up, wherein the polymer solution has a temperature region in which it shows optical isotropy and a temperature region in which it shows optical quasi-anisotropy; the temperature of the die or orifice is maintained within a region in which the polymer solution shows optical isotropy; the temperature of the gaseous atmosphere and/or the coagulating bath is maintained within a range in which the polymer solution shows optical quasi-anisotropy; and wherein the inherent viscosity of the aromatic polyazole (A) is adjusted to not more than 15.

The molecular weight of the aromatic polyazole (A) is usually such that its inherent viscosity as a measure of the molecular weight, is at least 1, preferably at least 2, especially preferably at least 2.5. On the other hand, the polyazole (A) having too high an inherent viscosity is undesirable. If it reaches 20, a product of good quality cannot be obtained. To secure the effects of this invention, the inherent viscosity of the polyazole (A) is not more than 15, preferably not more than 12, especially preferably not more than 10.

In the case of forming a pulp-like material, polyazoles (A) having a higher molecular weight can be preferably used.

The temperature region in which the polymer solution shows optical isotropy and the temperature region in which it shows optical quasi-anisotropy vary depending upon the types and the degrees of polymerization of the polymers, the ratio of the polymers, and the polymer concentration. They can be determined by the following measuring method.

A given polymer solution is prepared, spread thin between slide glasses, and held by a heating stage so that the thickness of the polymer solution layer becomes 0.1 mm. The so prepared sample is observed under a polarized microscope through a cross Nicol. First, the temperature of the sample is lowered below room temperature (20° C.) to cause the polymer solution between the slide glasses to show optical anisotropy.

When the temperature of the sample is gradually (5° C./min.) raised by using a melting point measuring device (made by Yanagimoto Co., Ltd.) while the sample is observed under the polarized microscope, the visual field becomes dark at a specific temperature and the polymer solution is seen to change to an optically isotropic phase. This specific temperature is called a transition temperature. After confirming that the solution becomes optically isotropic, the polymer solution between the slide glasses is rapidly lowered from this temperature to a predetermined temperature, for example, 20° C. This cooling is achieved by placing the slide glass having the polymer solution thereon without exerting shear on a substance having good thermal conductivity, such as copper or silver, cooled at the above predetermined temperature. When this sample is observed under a polarized microscope through a cross Nicol, the time which elapses until the polymeric solution becomes optically anisotropic varies widely depending upon the conditions for the preparation of the polymer solution. Generally, as the aforesaid transition temperature is higher, the time which elapses until the solution becomes optically anisotropic becomes shorter.

If at the time of the aforesaid rapid cooling, the time which elapses from the initiation of cooling until the polymer solution becomes optically anisotropic is at least 30 seconds, this cooling temperature is defined as the temperature which shows optical quasi-anisotropy. In other words, optical quasi-anisotropy denotes a state which is apparently optical isotropic, but is turning optically anisotropic over the course of at least 30 seconds. The difference between optical anisotropy and optical quasi-anisotropy is that optical isostropy does not change to optical anisotropy however long the time passes. If the polymer solution turns optically anisotropic within 30 seconds from the initiation of cooling, the cooling temperature is not referred to as the temperature showing optical quasi-anisotropy, but as the temperature showing optical anisotropy.

According to the process of this invention, the temperature regions for optical isotropy and optical quasi-anisotropy are measured after the types and the molecular weights of the aromatic polyazole (A) and the aromatic copolyamide (B), the type of the solvent system, the polymer concentration, and the ratio of the polymers are determined. Then, the temperature of the die or orifice is maintained in the temperature region for optical isotropy, and the temperature of the gaseous atmosphere and/or the coagulating bath, within the temperature region for optical quasi-anisotropy. The polymer solution is then extruded from the die or orifice in a customary manner, and introduced into the coagulating bath via the gaseous atmosphere. The extrudate is then continuously taken up. Thus, a film or a filament is produced by the semi-dry semi-wet method.

The polymer solution extruded from the die or orifice at this time is abruptly cooled in the gaseous atmosphere and/or the coagulating bath and rapidly attains a temperature at which it shows optical quasi-anisotropy. Hence, conditions are created under which the polyazole (A) forms an aggregate of very minute rods. On the other hand, when the temperature of the gaseous atmosphere and/or the coagulating bath is adjusted to the temperature region for optical anisotropy (the aforesaid time is less than 30 seconds), the resulting molded product has inferior stretchability and does not show good dynamical properties.

When the polyazole (A) has an inherent viscosity of not more than 15, especially not more than 12, the polyazole (A) easily forms very minute aggregates of rods. Thus, the dynamical properties of the resulting molded product are improved unexpectedly presumably because the polyazole (A) is rapidly oriented in the aromatic copolyamide (B) in a subsequent stretching operation. In contrast, if the temperature of the gaseous atmosphere and the coagulating bath is within the temperature region for optical isotropy, the dynamic properties, especially the absolute modulus value, of the final molded article are inferior to those of products obtained by the process of this invention.

As another means of forming rod-like microscopic aggregates of the polyazole (A), it is known that by properly selecting the polymer concentration of the polymer solution, the polyazole (A) molecules are aggregated in a rod-like form within a region in which transition from an optically isotropic phase to an optically anisotropic phase occurs at a certain temperature. This method, however, cannot give a molded article having good property as compared with the process of this invention presumably because the conditions for forming the microscopic aggregates of the polyazole (A) are within very narrow ranges.

The coagulating bath for coagulating the polymer solution is, for example, a mixture of a solvent insoluble in the solvent used, for example an aqueous solution of sulfuric acid or an aqueous solution of methanesulfonic acid. The temperature of the coagulating bath should be maintained at a temperature at which the polymer solution is optically quasi-anisotropic.

Generally, to provide a large temperature difference between the slit die or orifice and the coagulating bath would be desirable for obtaining a highly oriented high modulus molded article by the subsequent stretching operation.

The ratio of the polyazole (A) and the aromatic copolyamide (B) used in this invention, as A/A+B, is desirably within the range of 0.15 to 0.70 by weight. If the ratio is less than 0.15, the reinforcing effect of the polyazole (A) is small, and if it exceeds 0.70, the orientability of the polyazole (a) is reduced, and the characteristic feature of this invention cannot be obtained.

The inherent viscosity of the polyazole (A), as used in this invention, is determined at 30° C. for a solution of the polyazole (A) in 100% sulfuric acid or methanesulfonic acid or chlorosulfonic acid in a concentration of 0.2 g/100 cc in a customary manner. If the polyazole (A) dissolves in any of the above solvents, the lowest inherent viscosity is defined as the inherent viscosity of the polyazole (A).

The intimate mixture of this invention in pulp form can be produced, for example, by a process which comprises dissolving the substantially linear aromatic polyazole (A) and the sparingly crystallizable aromatic copolyamide (B) in a ratio represented by A/(A+B)=0.15−0.70 by weight in a common solvent to prepare a polymer solution satisfying the following formulae (1) and (2)

$$C \leq Cr + K \tag{1}$$

$$K \leq 100/Wr \tag{2}$$

where C is the total weight (%) of the aromatic polyazole (A) and the aromatic copolyamide (B) in the solution, Cr is the critical polymer weight (%) at which the solution begins to change from an optically isotropic phase to an optically anisotropic phase, K is a number which depends upon Wr in formula (2) and does not exceed 4, and Wr is the weight (%) of the aromatic polyazole (A) in the entire polymers, and causing the resulting polymer solution to act on a coagulating agent under a shearing stress to precipitate a pulp-like material.

Furthermore, the intimate mixture in pulp form can be produced, for example, by a process which comprises dissolving the substantially linear aromatic polyazole (A) and the sparingly crystalline aromatic copolyamide (B) in a ratio represented by A/(A+B)=0.15−0.70 by weight in a common solvent to prepare a polymer solution satisfying the following formulae (1) and (2)

$$C \leq Cr + K \tag{1}$$

$$K \leq 100/Wr \tag{2}$$

where C, Cr, K and Wr are as defined, to prepare a polymer solution, wet-molding the polymer solution using a coagulating agent, if required stretching and/or heat-treating the molded product, to form a highly oriented filament or a highly monoaxially oriented film, and pulverizing the product into a pulp-like material.

The polyazole (A) and the aromatic copolyamide (B) should be dissolved in the aforesaid concentration range in the same solvent or solvent composition. A molded article and a laminate obtained by laminating and compression-molding a pulp-like material prepared by using a polymer solution having a concentration exceeding the above-specified limit shows melt-adhesive property but its dynamical properties are not satisfactory. In contrast, a tough molded article can be obtained from the pulp-like material prepared by using a polymer solution having the aforesaid concentration range. The K value defined in the above formulae should not exceed 4, and is preferably 3, more preferably 2.

That the polymer solution used in this invention should have a polymer concentration within the aforesaid range means that the pulp-like material in accordance with this invention should be precipitated under shear from a solution most of which is substantially optically isotropic, or a molded article such as fibers or films as precursor of the pulp-like material of the invention should be wet-molded from a solution most of which is substantially optically isotropic. The "optical isotropy", as referred to in this invention, is one which is observed in a stationary state.

The optical properties of the polymer solution used in this invention can be observed, for example, by using a polarized microscope.

Generally, polymer concentrations suitable for use in this invention can be selected by drawing a phase diagram by varying the ratio of the polymer components (A) and (B) and the polymer concentration and temperature of the polymer solution. The transition concentration Cr in the above formulae means the polymer concentration of the solution at the temperature at which the pulp-like material or its precursor molded article is produced.

Precipitating agent

The pulp-like material of this invention can be obtained by various methods. Typical examples are the aforesaid shear precipitation method by which the pulp-like materials is directly obtained and the aforesaid precursor method by which a precursor such as a fiber or tape is first molded, and then converted to the pulp-like material by such an operation as beating. The pulp-like material or its precursor in accordance with this invention can be obtained by the wet method. A precipitating agent is used in the shear precipitation method, whereas a coagulating agent is used in the latter precursor method. These agents are generically called the "precipitating agent" in this invention.

When a certain liquid hardly dissolves the polymer, it can be used as the precipitating agent. Preferably, liquids used as the precipitating agent are miscible with the solvent for the polymers. Water and a mixture of water with the solvent dissolving the polymers are suitable examples of the precipitating agent for use in this invention. If required, the properties of the resulting pulp-like material can be controlled by using a thickener such as sodium carboxymethyl cellulose or polyvinyl alcohol.

Additives

Additives for improving the properties of the pulp-like material, paper-like sheet, pulp laminate, etc. may be added to at least one of the polymer solution, the precipitating agent and the slurry of the pulp-like material obtained from them. Typical examples of the additives are natural or synthetic pulps, natural or synthetic fibers, metal fibers, and inorganic fibers. Dyes or pigments, antistatic agents, surface-active agents, fillers, and antioxidants may also be used as required.

Production of the pulp-like material by the shear precipitation method

A known method of producing a synthetic pulp may be cited as one example of the shear precipitation method. For example, Japanese Patent Publications Nos. 11851/1960 and 5732/1962 disclose a method which comprises mixing a polymer solution and a precipitating agent under shearing stress by means of a stirred mixer having a high-speed rotating cutting blade, and subjecting the precipitated polymer particles to a shearing and beating action to produce a pulp-like material. This method can be applied to the present invention.

Production of the pulp-like material by cutting and crushing fibers, tapes, etc. under shearing stress As is the case with the production of split fibers, the pulp-like material may be produced by molding a polymer solution into a fiber or film using a precipitating agent as a coagulating bath, optionally stretching the fiber or film to orient it, and thereafter beating the fiber or film. Application of this method is particularly effective when there can be obtained a fiber or film in which the aromatic polyazole (A) is in a major proportion or the aromatic copolyamide (B) is also relatively rigid and highly oriented. Specifically, according to this method, the polymer solution in accordance with this invention is introduced into the precipitating agent and extruded into a coagulating bath or a coagulating atmosphere into such a form as a mass, particles, a powder, a filament, a cord, a film, a sheet or a spray through a spinneret nozzle or a slit for example. As required, the resulting molded article is further stretched and heat-treated. Finally, the molded article is beaten (or cut) to form a pulp.

Generally, in such a pulp-like material which has been subjected to a beating action, the polyazole (A) is highly oriented. As a result, a laminated structure obtained finally by laminating such pulp-like materials by melt-adhesion, in many cases, shows high dynamic properties.

This beating method may also be applied to the aforesaid shear precipitating method. Specifically, the orientability of the polymer components (A) and (B) in the pulp-like material obtained by the shear precipitating method from the polymer solution using a mixer may be increased by beating it further by the beating method.

In the present invention, a molded article such as a filament, tape or film suitable for conversion into a pulp-like material in the subsequent beating step can be obtained by properly combining the nozzle diameter, the slit width, the extrusion speed, the type and temperature of the coagulating system, the take-up speed, the solvent removing speed and the timing of washing during the molding operation and conditions for the stretching or heat-treating the molded article in a bath or under heat.

The primary molded article, if required, may be subjected to coagulation or solvent removal in an inert atmosphere, a steam atmosphere or an aqueous coagulating bath containing water, an inorganic salt, or an organic solvent at a high or low temperature.

Since the molded article obtained by the above method is highly oriented, parts having a weak bonding force occur transversely along the orienting direction. Hence, application of a moderate mechanical force such as a shearing force very easily converts the molded article into a pulp-like material. For example, such a pulp-like material can be obtained by applying a mechanical shearing stress such as crushing, grinding and mashing, extrusion, impact and beating. Various types of grinders, mills and pulverizers may be used as means for applying such a shearing stress. Various types of beaters and refiners used in the production of paper pulp may also be applied.

The present invention also provides a laminated structure obtained from an intimate mixture comprising (A) a substantially linear aromatic polyazole and (B) a sparingly crystallizable aromatic copolyamide having a glass transition temperature of at least 200° C. and a flow initiation temperature of not more than 500° C. in such proportions represented by $A/(A+B)=0.15-0.70$ by weight.

A light-weight high modulus laminated material having good heat resistance can be produced by laminating and thermally compression-molding layers of the primary molded article mentioned above and composed of the highly rigid aromatic polyazole (A) and the aromatic copolyamide (B) having melt-adhesive property.

According to the invention, there is also provided a process for producing a laminated structure, which comprises laminating layers of an intimate mixture comprising (A) a substantially linear aromatic polyazole and (B) a sparingly crystallizable aromatic copolyamide having a glass transition temperature of at least 200° C. and a flow initiation temperature of not more than 500°

C. in such proportions represented by $A/(A+B)=0.15-0.70$ by weight, and compression-molding the laminate at a temperature satisfying the following formula (3)

$$Tg \leqq Ta \leqq Td \tag{3}$$

wherein Ta is the compression molding temperature (°C.), Tg is the glass transition temperature (°C.) of the aromatic copolyamide (B) and Td is the temperature (°C.) at which the aromatic copolyamide shows a 15% weight loss in an inert atmosphere, under a pressure of 100 to 5,000 kg/cm².

If the primary molded article obtained is in the form of a tape, a film or a paper-like sheet formed from pulp, a multilayer laminated structure can advantageously be produced by compressing a plurality of layers of such a molded article by roll or a press under heat. If the primary molded article is in the form of particles or pulp, it can be advantageously compressed under heat in a mold. To secure heat stability, it is possible to remove gases adsorbed on the molded article, or to purge the molded article with an inert gas beforehand.

The thermal compression molding temperarture is preferably higher than the glass transition temperature of the aromatic copolyamide (B) and lower than the temperature at which the molded article shows a 15% weight loss. The "temperature at which the molded article shows a 15% weight loss" denotes the temperature at which the molded article shows a 15% weight decrease when it is heated at a rate of 10° C./min. in an inert gaseous atmosphere by a thermogravimetric method. The compression molding pressure is usually at least 100 Kg/cm², preferably 300 kg/cm², more preferably 400 kg/cm².

The timing of thermally compression molding the primary molded article may be before heating, during temperature elevation, or after it has been heated to a specific temperature. When orientation is relaxed considerably during temperature elevation in the lamination and thermal compression molding of the primary article having increased orientation, it is also possible to exert a load in advance at temperatures below the point at which relaxation of orientation occurs, and then to elevate the temperature to the desired one as rapidly as possible.

The melt-adhesion of layers of the primary molded article of this invention by lamination and thermal compression molding sometimes require a longer period of time than the thermal compression molding of the matrix polymer itself [aromatic copolyamide (B)]. Lamination and thermal compression molding by a hot roll is advantageous for the continuous production of the laminated structure. But where thermal compression molding is required to be carried out for a long period of time, it is also possible to laminate layers of the molded article preliminarily by means of a hot press roll, and then to compression mold the pre-laminated structure in a mold or the like under heat.

The lamianted structure of this invention preferably has a thickness of at least 0.5 mm. With a system composed only of the reinforcing polymer used in this invention [the polyazole (A)], thin molded articles such as fibers or films obtained, in many cases, have a high modulus. But since such a system has to be molded from solution, it is difficult to attain a high modulus in thick molded articles such as round rods, sheets and boards which are useful as structural materials. According to this invention, a laminated structure having a thickness of at least 0.5 mm useful as a structural material can be easily produced by laminating a required number of layers of the primary molded article and compression molding them under heat. At this time, layers of the pulp-like material as the primary molded article may be laid in sheet form and compression molded under heat. A preferred method comprises forming the pulp-like material into a sheet by the wet or dry method, optionally slitting the sheet, thereafter laminating such slit sheet layers, and compression-molding them under heat to melt-adhere the layers and give a laminated structure. The advantage of the latter method is that since the lamination of the pulp layers in the thickness direction is more uniform, a more uniform melt-adhered laminated structure can be obtained even when layers of a pulp-like material having low heat distortion are compression-molded under heat.

When sheets formed from the pulp-like material are used, a laminated structure can also be produced continuously by feeding the required number of sheets to a hot roll or the like. By properly selecting the combination and ratio of the polyazole (A) and the aromatic copolyamide (B) in the starting pulp-like material, a high-modulus laminated material having good heat resistance and high dynamical properties can be obtained. The laminated material obtained from the pulp-like material is superior to a laminated material obtained by compression molding a polymer alloy powder of the corresponding composition under heat. Firstly, since the pulp-like material to be laminated assumes a fibril form and has a high specific surface area. Secondly, since the pulp-like material itself is oriented or preliminarily oriented and the orientation further proceeds during the compression molding, the resulting laminated structure attains very high dynamical properties. Thirdly, when the pulp-like material is first molded into paper-like sheets and then such sheets are laminated and compression molded under heat, a laminated structure having more uniform quality in the thickness direction can be obtained.

Thus, the present invention gives a monoaxially oriented heat-resistant laminated structure having a modulus of at least 20 GPa, preferably at least 30 GPa, and at least two-dimensionally isotropic heat-resistant laminated material having a modulus of at least 8 GPa, preferably at least 10 GPa.

By taking advantage of the aforesaid characteristics, the laminated structure of this invention is very useful as a light-weight structural material having good heat resistance.

The following examples illustrate the present invention more specifically. It should be understood that the scope of the invention is not limited by these examples.

The size of crystallites was measured by the following method.

Method of measuring the size of crystallites

By using an X-ray generating device (Rotaflex RU-3H, supplied by Rigaku Denki Co., Ltd.), the size (D) of crystallites is calculated in accordance with the Scherrer's equation.

$$D = 0.94 \times \lambda / [(B-b) \cos \theta]$$

where B is the half-value width of a measured peak, b is a constant for correction on the device, and $\lambda$ is 1.5418 Å of Cu-K rays.

Heat-treatment for crystallization was carried out for 5 hours at a temperature higher than the glass transition temperature but lower than the flow initiation temperature.

Most of the aromatic copolyamide (B) has substantially one or two overlapping main peaks (having the maximum intensity) at $2\theta = 16°$–$25°$ in the equatorial direction.

Where the two main peaks overlap, they are separated from each other assuming that distributions having the peaks each constitute a Gaussian distribution. The peak having a larger intensity was employed.

All parts in these examples are by weight.

EXAMPLE A1

By a customary method, poly-p-phenylenebenzobisthiazole (abbreviated PPBT) having an inherent viscosity, in methanesulfonic acid solvent, of 19 was obtained as a polyazole (A).

3,4'-Diaminodiphenylether (67 mole %) and p-phenylenediamine (33 mole %) were dissolved in N-methylpyrrolidone to a concentration of 8% in an atmosphere of dry nitrogen. The solution was cooled to 0° C., and with vigorous stirring, a powder of terephthaloyl dichloride (100 mole %) 0 was quickly added to the solution, and polymerized at 35° C. for 1 hour. The reaction mixture was precipitated with water and neutralized to give an aromatic copolyamide (B) (designated PPOT-67) having an inherent viscosity in sulfuric acid solvent of 3.5. The flow initiation temperature of PPOT-67, measured by a flow tester, was 445° C. It had a glass transition temperarure, determined by DMA, of 242° C. When heat-treated at 340° C. (which is higher than the glass transition temperature but lower than the flow initiation temperature) for about 5 hours, the matrix polymer (B) had a crystallite size of 12 Å.

The PPOT-67 and PPBT were mixed in a weight ratio of 75:25 and dissolved in a methanesulfonic acid solvent to a total concentration of 5%. The resulting polymer solution was optically anisotropic at room temperature, but became optically isotropic when heated to 85° C. The polymer solution was put in a plunger-type cell equipped with a slit nozzle having a size of 100 micrometers×10 mm and extruded at a linear velocity of 4 m/min. into a coagulating bath composed of a 30% aqueous solution of methanesulfonic acid kept at −25° C. The unstretched tape from the coagulating bath was washed with water and neutralized, and stretched in hot water at 1.3 times and further to 2.5 times at 400° C.

The tape had a tensile modulus of 49 GPa in the stretching direction.

Layers of the resulting tape were laminated in a mold, and after degassing, compression-molded at a temperature of 350° C. under a pressure of 1,000 kg/cm² for 15 hours. The resulting molded article had a flexural modulus of 51 GPa.

EXAMPLE A2

PPBT and PPOT-67 obtained in Example A1 were mixed in a weight ratio of 25:75, and dissolved in methanesulfonic acid to a total polymer concentration of 2.8%. The polymer solution was dropped into stirred water to give a powdery polymer composite.

The polymer composite was put in a mold, and compression-molded at a temperature of 350° C. under a pressure of 2,000 kg/cm² for 12 hours. The resulting molded article had a flexural modulus of 8.3 GPa and a flexural strength of 30.2 kg/mm².

EXAMPLE A3

By polymerization in a customary manner, poly-p-phenylenebenzobisoxazole (abbreviated PPBO) having an inherent viscosity, in methanesulfonic acid, of 12 was obtained as a polyazole (A).

3,4'-Diaminodiphenylether (50 mole %) and p-phenylenediamine (50 mole %) were dissolved in N-methylpyrrolidone to a concentration of 6%, and terephthaloyl dichloride (100 mole %) was quickly added to the solution. The polymerization reaction was carried out at 35° C. for 1 hour. After the reaction, the reaction mixture was neutralized with calcium hydroxide, precipitated and washed to give a polymer (abbrevaited PPOT-50) as a matrix polymer (B). PPOT-50 had an inherent viscosity, in methanesulfonic acid, of 6.2, a glass transition temperature of 260° C. and a flow initiation temperature of 462° C. When heat-treated at 360° C. for 5 hours, PPOT-50 had a crystallite size of 22 Å.

PPBO and PPOT-50 were mixed in a weight ratio of 1:3, and dissolved in methanesulfonic acid to a total polymer concentration of 2.5% to give a solution which was optically isotropic at 30° C.

The solution was cast on a glass plate by means of a doctor knife (having a slit width of 200 micrometers), and coagulated with a 30% aqueous solution of methanesulfonic acid at −25° C. to form a film. The film was stretched in a hot water bath, dried, and further stretched in an oven at 350° C. and 500° C., respectively. PPOT-50 was coated to a thickness of about 0.1 micrometer on the surface of the film. Ten such films were stacked, and compression-molded at a temperature of 350° C. under a pressure of 500 kg/cm² for 10 hours in an atmosphere of nitrogen.

The resulting sheet had a tensile modulus in the stretching direction of 61 GPa. No delamination between the individual film layers occurred in the resulting sheet.

EXAMPLE A4 p-Phenylenediamine (30 mole %) and m-phenylenediamine (70 mole %) were dissolved in N-methylpyrrolidone, and terephthaloyl dichloride (100 mole %) was added. The mixture was stirred to give a polymer having an inherent viscosity in sulfuric acid of 1.5 as a matrix polymer (B) (designated as APA-30 hereinafter). The APA-30 had a glass transition temperature, determined by DMA, of 220° C. and a flow initiation temperature of 330° C. When the APA-30 powder was heat-treated at 280° C. for 5 hours, it was found to have a crystallite size of 8 Å.

PPBT obtained in Example A1 as a reinforcing polymer (A) and APA-30 were mixed in a weight ratio of 1:1, and dissolved in methanesulfonic acid to a total polymer concentration of 4%. At a temperature of 60° C., the polymer solution was optically isotropic. This solution was extruded from a slit die into a 30% aqueous solution of methanesulfonic acid at −25° C. by the semi-dry semi-wet method to obtain a polymeric composite tape. The tape was stretched to 1.5 times in a water bath and further to 2.0 times at 310° C.

Layers of the tape were filled in a mold having a size of 30×3×2 (mm) and compression-molded at a temperature of 320° C. under a pressure of 400 kg/cm². The individual layers were bonded to each other well, and the molded article had a flexural modulus of 35 GPa and a flexural strength of 26 kg/mm².

EXAMPLES B1-B5

Poly-p-phenylenebenzobisthiazole (abbreviated PPBT) having an intrinsic viscosity in methanesulfonic acid of 3.0 was obtained by polymerization in a customary manner and used as the polyazole (A).

PPBT and PPOT-50 obtained in Example A3 as the aromatic copolyamide (B) in a weight ratio of 25:75 were dissolved in methanesulfonic acid to form a solution having a polymer concentration of 4, 5, 6, 7 and 8% respectively. The temperature at which the anisotropic phase of the polymer composite solution changes to an isotropic phase (phase transition temperature) is shown in Table 1.

In each run, the polymer solution was heated to 96° C. which was above the phase transition temperature, and cooled on a silver plate at 20° C. The time which elapsed until the polymer solution became optically anisotropic was measured, and the results are shown in Table 1.

The polymer solution was put in a syringe-type receptacle and extruded from an orifice having a diameter of 0.25 mm and kept at each of the temperatures indicated in Table 1 at a linear velocity of 5 m/min., passed through the pneumatic layer (temperature 25° C., distance 18 cm), and introduced into ice water as a coagulating bath. The coagulated, slightly stretched undrawn yarn was fully washed, neutralized with aqueous ammonia, and wound up on a bobbin. It was stretched in a hot water bath at 60° C., air-dried, further dried in an oven at 200° C., and hot-drawn in an electric furnace at 350° and 450° C. The dynamical properties of the hot-drawn yarn are shown in Table 1. The effects of the invention were clearly exhibited.

TABLE 1

| Example | B1 | B2 | B3 | B4 | B5 |
|---|---|---|---|---|---|
| PPBT/PPOT-50 ratio | 25/75 | 25/75 | 25/75 | 25/75 | 25/75 |
| Polymer concentration (%) | 4 | 5 | 6 | 7 | 8 |
| Phase transition temperature (°C.) | none (isotropic) | none (isotropic) | 30 | 62 | 85 |
| Time till appearance of anisotropy (sec.) | — | — | >60 | >60 | 3 |
| Quasi-anisotropy | no | no | yes | yes | no |
| Orifice temperature (°C.) | 60 | 60 | 80 | 80 | 90 |
| Diameter of the yarn (μm) | 31 | 30 | 32 | 37 | 31 |
| Modulus (GPa) | 75 | 89 | 123 | 125 | 68 |
| Elongation (%) | 3.1 | 3.1 | 2.8 | 2.8 | 2.0 |
| Strength (GPa) | 1.0 | 1.0 | 1.9 | 1.5 | 0.9 |

EXAMPLES B6-B10

The same PPBT and PPOT-50 as used in Example B1 in a weight ratio of 30:70 were dissolved in methanesulfonic acid to prepare a solution having a total polymer concentration of 4, 5, 6, 7, and 8%, respectively.

In each run, when the polymer solution changed from an anisotropic phase to an isotropic phase, the phase transition temperature was measured. Furthermore, the polymer solution was heated to 90° C., and cooled on a silver plate at 20° C. The time which elapsed until the polymer solution became optically anisotropic was measured, and the results are shown in Table 2.

The solution was spun and stretched in the same way as in Example B1, and the dynamical properties of the stretched yarn were evaluated. The results are shown in Table 2. The yarns which satisfied the conditions specified in the present invention showed good dynamical properties.

TABLE 2

| Example | B6 | B7 | B8 | B9 | B10 |
|---|---|---|---|---|---|
| PPBT/PPOT-50 ratio | 30/70 | 30/70 | 30/70 | 30/70 | 30/70 |
| Polymer concentration (%) | 4 | 5 | 6 | 7 | 8 |
| Phase transition temperature (°C.) | none | 25 | 35 | 65 | 80 |
| Time till appearance of anisotropy (sec.) | — | >60 | >60 | >60 | 3 |
| Quasi-anisotropy | — | yes | yes | yes | no |
| Orifice temperature (°C.) | 65 | 80 | 80 | 80 | 95 |
| Diameter of the yarn (μm) | 25 | 24 | 30 | 33 | 51 |
| Modulus (GPa) | 74 | 100 | 143 | 121 | 71 |
| Elongation (%) | 3.0 | 4.5 | 2.4 | 3.6 | 2.3 |
| Strength (GPa) | 1.0 | 2.0 | 1.7 | 1.5 | 0.9 |

EXAMPLES B11-B12

PPBT having an inherent viscosity of 7.3 prepared as in Example B1 and PPOT-50 obtained in Example B1 in a weight ratio of 25:75 were dissolved in a methanesulfonic acid to form a polymer solution having a total polymer concentration of 6%.

The polymer solution had a phase transition temperature of 62° C. When it was rapidly cooled at 20° C., the time which elapsed until it became anisotropic was more than 60. Thus, it showed quasianisotropy. The polymer solution was extruded from a slit die having a size of 10 mm×0.1 mm, and stretched in hot water and then hot-stretched in a customary manner to form a film having a thickness of 51 micrometers, a modulus of 82 GPa, an elongation of 3.5%, and a strength of 1.1 GPa.

A polymer solution obtained as above and having a total polymer concentration of 4% did not show quasianisotropy, and a film prepared from its optically anisotropic solution had a thickness of 52 micrometers, a modulus of 53 GPa, an elongation of 2.6% and a strength of 0.8 GPa.

EXAMPLE B13

PPBT having an inherent viscosity of 21 was obtained by polymerization as in Example B1.

PPBT and PPOT-50 in a weight ratio of 25:75 were dissolved to form a solution having a polymer concentration of 3.5%. The solution had a phase transition temperature of 82° C. When it was cooled at 20° C., the time which elapsed until it became anisotropic was about 20 seconds. Thus, it had anisotropy.

The solution was extruded from an orifice kept at 90° C., and stretched in hot water and then hot-stretched to obtain a filament of the polymer composite. The filament had a diameter of 41 micrometers, a modulus of 65 GPa, an elongation of 2.3%, and a strength of 1.1 GPa. These properties were inferior to those of a filament obtained by using PPBT having a lower inherent viscosity.

EXAMPLE C1

PPBT (20.0 g) as the polyazole (A) and 20.0g of copoly-m-phenylene(isophthalamide/terephthalamide) [iso/tere=2:1] [abbreviated PM(IA/TA)] as the aromatic copolyamide (B) were dissolved in 2.6 kg of methanesulfonic acid. The solution was precipitated under a shearing stress in a mixer using a 50% aquoeus solution of N-methylpyrrolidone as a precipitant. The resulting pulp-like material was filtered, and washed with water, and the remaining methanesulfonic acid was removed completely by using aqueous ammonia. The pulp-like material was again washed with water, and the resulting aqueous slurry of the pulp-like material was subjected to a sheet-forming operation by the wet method to obtain a sheet of the polymer composite. The sheet was slit, put in a mold, and compressed at a temperature of 310° C. under reduced pressure for 15 hours to obtain a laminated structure having a thickness of 2 mm. The laminated structure had a flexural strength of 35 MPa and a flexural modulus of 15 GPa.

EXAMPLE D1

PPBT (20.0 parts) as the polyazole (A) and 20.0 parts of PM(IA/TA) as the aromatic copolyamide (B) were dissolved in 2600 parts of methanesulfonic acid. The solution was dry jet wet-spun through a spinneret having 5 holes with a diameter of 0.3 mm at a spinning speed of 7 m/min. using ice water as a coagulating agent while maintaining the distance between the spinneret and the surface of the coagulating bath (air gap) at 80 mm. The spun filament was drawn to 1.3 times in water, and then the remaining methanesulfonic acid was completely removed by using ammonia. The filament was again washed with water, dried, and then hot-drawn to 1.1 times at 450° C. The filament was beaten by the wet method by means of a TAPPI-type Niagara beater. The resulting pulp-like material was subjected to a wet sheet-forming operation to obtain a sheet composed of the polymer composite pulp. The sheet was slit, put into a mold, and compression-molded at 310° C. under reduced pressure for 15 hours to give a laminated structure having a thickness of 1.5 mm. The laminated structure had a flexural strength of 42 MPa and a flexural modulus of 14 GPa.

EXAMPLE D2

Five parts of PPBT and 10 parts of PM (IA/TA) were dissolved in 430 parts of MSA to prepare a solution having a total polymer concentration of about 3% by weight. The solution was spun from a spinneret having 5 holes with a diameter of 0.3 mm into a coagulating bath composed of a 25% by weight aqueous solution of N-methylpyrrolidone at 20° C. at an extrusion speed of 5 m/min. The filament was drawn to 1.4 times in a water bath at 20° C. The remaining methanesulfonic acid was removed by neutralization with ammonia and washing with water. The resulting filament was beaten by a TAPPI-type Niagra beater to form a pulp-like material. The resulting slurry of the pulp-like material was subjected to a sheet-forming operation, and the sheet was compression-molded at an elevated temperature as in Example D1 to form a laminated material having a flexural strength of 25 MPa and a flexural modulus of 11 GPa.

What is claimed is:

1. An intimate mixture comprising (A) a substantially linear aromatic polyazole and (B) a sparingly crystallizable aromatic copolyamide having a glass transition temperature of at least 200° C. and a flow initiation temperature of not more than 500° C. in such proportions represented by $A/(A+B)=0.15-0.70$ by weight.

2. The intimate mixture of claim 1 wherein the aromatic polyazole (A) and the aromatic copolyamide (B) cannot substantially be distinguished from each other under an optical microscope.

3. The intimate mixture of claim 1 wherein the aromatic polyazole (A) and the aromatic copolyamide (B) are both shapeless.

4. The intimate mixture of claim 1 wherein the aromatic polyazole (A) is not a pre-formed fibrous aromatic polyazole.

5. The intimate mixture of claim 1 wherein when the aromatic copolyamide (B) is maintained for 5 hours at a temperature represented by $\frac{1}{2}(Tg+Tf)$ where Tg is the glass transition temperature of the copolyamide and Tf is the flow initiation temperature of the copolyamide, the resulting apparent crystals have a size of not more than 25 Å.

6. The intimate mixture of claim 1 wherein the ratio of $A/(A+B)$ is from 0.20 to 0.60 (by weight).

7. The intimate mixture of claim 1 wherein the aromatic polyazole (A) is selected from the group consisting of poly-p-phenylenebenzobisthiazole (PPBT) and poly-p-phenylenebenzobisoxazole (PPBO), and the aromatic copolyamide (B) is selected from the group consisting of a copolyamide (PPOT-67) derived from 3,4'-diaminodiphenylether (67 mole %), p-phenylenediamine (33 mole %) and terephthaloyl dichloride (100 mole %), a copolyamide (PPOT-50) derived from 3,4'-diaminodiphenylether (50 mole %), p-phenylenediamine (50 mole %) and terephthaloyl dichloride (100 mole %), a copolyamide (APA-30) derived from p-phenylenediamine (30 mole %), m-phenylenediamine (70 mole %) and terephthaloyl dichloride (100 mole %), and copoly-m-phenylene(isophthalamide/terephthalamide=2/1) [PM(IA/TA)].

8. The intimate mixture of claim 1 which is in the form of a film.

9. The intimate mixture of claim 1 which is in the form of a fiber.

10. The intimate mixture of claim 1 which is in the form of a powder.

11. The intimate mixture of claim 1 which is in the form of a pulp.

12. A laminated material obtained from the intimate mixture of claim 1.

* * * * *

UNITED STATES PATENT AND TRADEMARK OFFICE
CERTIFICATE OF CORRECTION

PATENT NO. : 4,749,753
DATED : June 7, 1988
INVENTOR(S) : TOSHIO NISHIHARA ET AL.

It is certified that error appears in the above-identified patent and that said Letters Patent is hereby corrected as shown below:

Claim 1, line 6 of the claim, "A/(A(+B)" should read --A/(A+B)--.

Signed and Sealed this

Eighth Day of November, 1988

*Attest:*

DONALD J. QUIGG

*Attesting Officer*  *Commissioner of Patents and Trademarks*